(12) United States Patent
O'Hara et al.

(10) Patent No.: US 11,343,228 B2
(45) Date of Patent: May 24, 2022

(54) AUTOMATICALLY CONFIGURING CLUSTERED NETWORK SERVICES

(71) Applicant: Arbor Networks, Inc., Westford, MA (US)

(72) Inventors: Sean O'Hara, Ypsilanti, MI (US); Alan Saqui, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 79 days.

(21) Appl. No.: 15/931,018

(22) Filed: May 13, 2020

(65) Prior Publication Data
US 2021/0359976 A1    Nov. 18, 2021

(51) Int. Cl.
| G06F 17/00 | (2019.01) |
| H04L 29/06 | (2006.01) |
| G06N 20/00 | (2019.01) |
| H04L 43/0817 | (2022.01) |
| H04L 43/0852 | (2022.01) |

(52) U.S. Cl.
CPC ......... *H04L 63/0227* (2013.01); *G06N 20/00* (2019.01); *H04L 43/0817* (2013.01); *H04L 43/0852* (2013.01); *H04L 63/1408* (2013.01); *H04L 63/1458* (2013.01); *H04L 63/20* (2013.01)

(58) Field of Classification Search
CPC . H04L 63/0227; H04L 63/20; H04L 63/1458; H04L 43/0852; H04L 43/0817; H04L 63/1408; G06N 20/00
See application file for complete search history.

(56) References Cited

U.S. PATENT DOCUMENTS

| 9,306,907 | B1 * | 4/2016 | Lopez ................... H04L 63/029 |
| 2006/0031942 | A1 * | 2/2006 | Jones ...................... H04L 63/10 |
| | | | 707/E17.001 |
| 2006/0143699 | A1 * | 6/2006 | Nagata ................ H04L 63/0227 |
| | | | 726/11 |
| 2008/0031233 | A1 * | 2/2008 | Ito ........................ H04L 63/0227 |
| | | | 370/355 |
| 2012/0254441 | A1 * | 10/2012 | Bailey ................... H04L 41/084 |
| | | | 709/226 |
| 2016/0359680 | A1 * | 12/2016 | Parandehgheibi .... G06T 11/206 |
| 2017/0149810 | A1 * | 5/2017 | Keshet ................ H04L 63/1425 |
| 2018/0124099 | A1 * | 5/2018 | St. Pierre ................ H04L 63/20 |
| 2018/0176139 | A1 * | 6/2018 | Mortensen .......... H04L 41/0893 |
| 2018/0183714 | A1 * | 6/2018 | Hay .................... H04L 41/0816 |

(Continued)

*Primary Examiner* — Phy Anh T Vu
(74) *Attorney, Agent, or Firm* — Locke Lord LLP; Scott D. Wofsy; Christopher J. Capelli

(57) ABSTRACT

A computer method and system for determining common network security filter settings for one or more clusters of network servers. Network traffic samples are captured which are associated with a plurality of network servers. The captured network traffic samples are collated with regards to each of the plurality of network servers. The collated network traffic is analyzed for each of the plurality of network servers for determining suggested network security filter settings for each network server. One or more clusters of network servers are determined contingent upon the determined suggested network security filter settings for each of the plurality of network servers. Common network security group filter settings are determined for each determined cluster of network servers.

17 Claims, 3 Drawing Sheets

(56) References Cited

U.S. PATENT DOCUMENTS

2018/0288094 A1* 10/2018 Ahuja ................. H04L 63/1416
2019/0342340 A1* 11/2019 Leap ....................... H04L 41/26
2020/0036734 A1*  1/2020 Radja ................. H04L 63/0227

* cited by examiner

AUTOMATICALLY CONFIGURING CLUSTERED NETWORK SERVICES

TECHNICAL FIELD

The disclosed embodiments generally relate to clustering network servers, and more particularly, to automatically determining network security filter settings for clustered network servers.

BACKGROUND

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

It is to be appreciated that the process of setting up security protection (e.g., thwarting DoS attacks) for servers currently requires a comprehensive understanding of each service that each server provides. For instance, such understanding typically requires knowing: the information such as the ports the services run on, the protocols used by each service, and the expected traffic behavior, are all typically necessary to determine the proper configuration of DoS countermeasures for a particular server.

Therefore, it is to be appreciated that in view of the aforesaid current technical limitations in the number of countermeasure configurations which may be concurrently performed, it is desirable to create customized DoS countermeasure configurations for application onto a group of servers having similar DoS countermeasure requirements (e.g., servers organized into protection groups). However, a problem in achieving this are operators/administrators network servers often do not have a complete understanding of what is on their network, and as such are unable to group their servers to receive optimal security countermeasures customized for server groupings.

For instance, the configuration of DDoS protection settings for a group of servers on a network is often a tedious and time-consuming process. Currently, network administrators/users configure servers via a two-step process by first determining how to group servers together by protection settings (i.e. protection groups), and then determining the protection settings for each group. While these two steps can be performed in either order, the overall process is difficult, typically requiring intimate knowledge regarding each individual server. Additionally, this process often needs to be repeated as networks changes and evolve over time as new services are added and servers are repurposed. Thus, a process of grouping servers together preferably requires to be performed on an ongoing basis.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with the illustrated embodiments, the methods and systems disclosed herein protect servers from network attacks such as Distributed Denial of Service (DDoS) and DoS attacks, which often are significantly contingent upon the type of service (or services) that is being provided by a network server. By classifying servers into distinct clusters (groups), the methods and computer systems of the illustrated embodiments more efficiently protect network servers by applying common security filter settings (e.g., DDoS/DoS countermeasures) customized for each server clustering/grouping relevant to their performed network services. Generally, the illustrated embodiments first analyze each server to determine the desired (suggested) protection settings for that server in isolation. An analysis of the servers is then performed for grouping the servers by similarity of their desired protection settings. For each server group, protection settings are determined/generated to preferably provide a best overall fit for servers in a particular grouping.

To achieve these and other advantages and in accordance with the purpose of the illustrated embodiments, in one aspect a computer method and system for determining common network security filter settings for one or more clusters of network servers is disclosed in which network traffic samples are captured that are associated with a plurality of network servers. The captured network traffic samples are collated with regards to each of the plurality of network servers. The collated network traffic is preferably analyzed for each of the plurality of network servers for determining suggested network security filter settings for each network server. Next, one or more clusters of network servers are determined from the plurality of network servers preferably contingent upon similarity of the determined suggested network security filter settings for each of the plurality of network servers. Common network security group filter settings are then determined for each determined cluster (group) of network servers. Typically, a common network security group filter setting will preferably be different with respect to other common network security group filter settings prescribed for other determined clusters (groups) of network servers.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
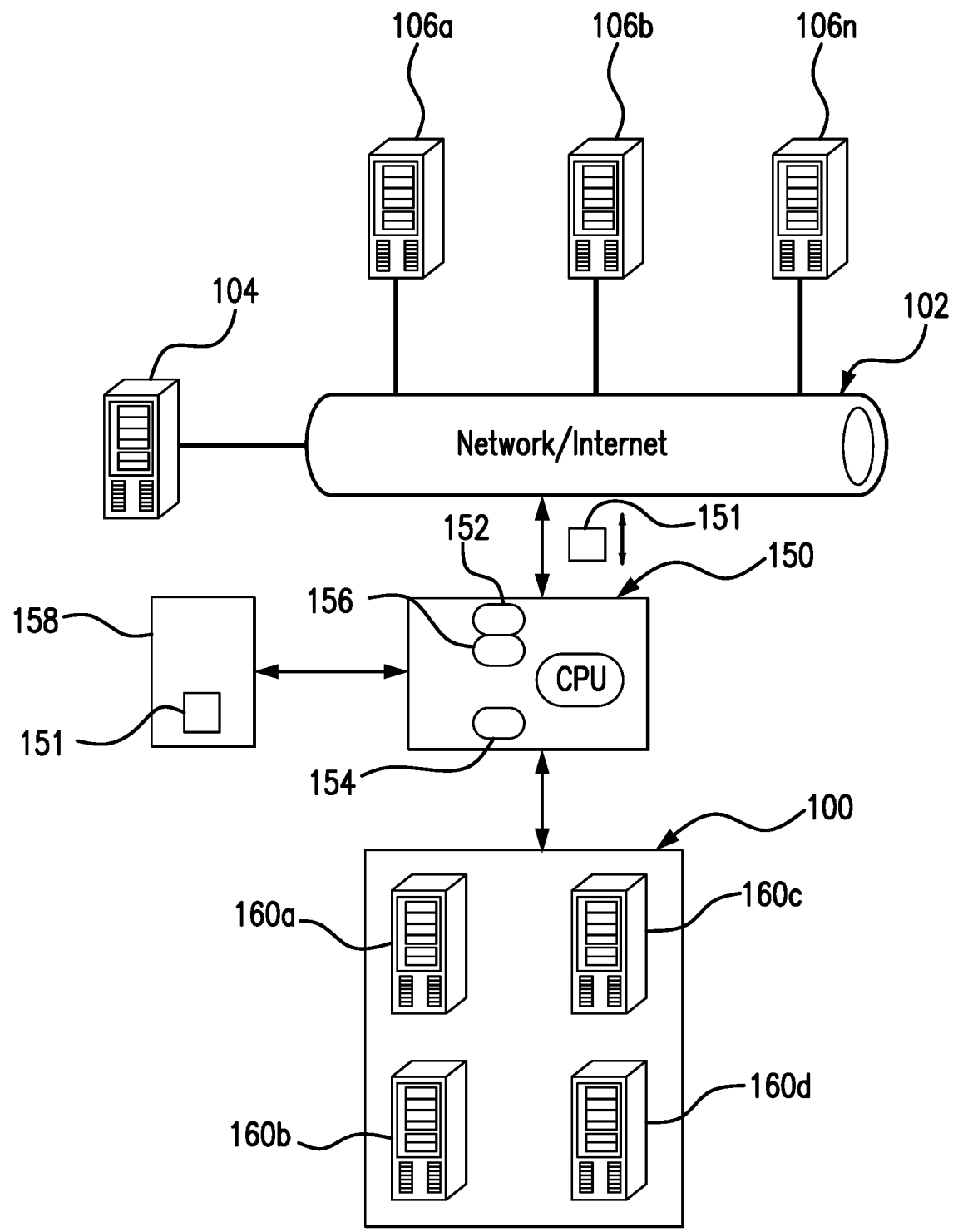
FIG. 1 illustrates an exemplary network communications system, in which an illustrative embodiment may be implemented.

The certain illustrated embodiments are now described more fully with reference to the accompanying drawings. The illustrated embodiments are not to be understood to be limited in any way to what is shown as they are merely to be understood to be exemplary of the illustrated embodiments, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the illustrated embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which the illustrated embodiments belong. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the illustrated embodiments as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the illustrated embodiments are not to be limited by what has been particularly shown and described, except as indicated by the appended claims.

The present illustrated embodiments relate to determining a comprehensive understanding of the services that each network server performs for automatically configuring security filter settings (e.g., DDoS protection) for servers determined to be clustered together for providing efficient security mitigation protection. Due to current technical limitations in the number of countermeasure configurations that can be concurrently performed, and the difficulty involved for a network administrator to determine security filter settings for each network server, an object of the illustrated embodiments is to automatically determine/generate customized security filter setting configurations for application onto a group of servers determined to have similar security requirements (i.e., protection groups).

Turning now descriptively to the drawings, in which similar reference characters denote similar elements throughout the several views, FIG. 1 illustrates a generalized monitoring/countermeasure system for applying customized security filter settings (e.g., DDoS countermeasures) configurations to a group of servers determined to have similar security filter setting requirements (i.e., protection groups). The exemplary embodiment of FIG. 1 depicts the relationship between a protected network 100, protection system 150 (e.g., a network monitoring device), Network/Internet 102, and external host devices 104, 106a-106n. It is to be appreciated that protected network 100 includes a plurality of servers 160a-160n preferably consisting of a plurality of server types, including, but not limited to: Generic; Web; DNS; Mail; VoIP; VPN; RLogin; and File Servers. It is to be appreciated that in accordance with an illustrated embodiment, the protection system 150 is configured and operable to automatically determine one or more clusters (groups) of network servers (160a-160d) from the protected network 100 to receive common security filter settings (e.g., DDoS countermeasures) to be applied to a group of servers having similar security filter setting requirements (i.e., protection groups).

It is to be appreciated that the illustrated embodiment of FIG. 1 is merely provided for ease of discussions purposes for depicting a generalized exemplary environment of use for a security protection system. As such, it is to be understood the illustrated embodiment of FIG. 1 is not to be understood to be limiting, as other system configurations are capable of carrying out the process for automatically determining one or more clusters of network servers from the protected network 100 to receive common security filter settings (e.g., DDoS countermeasures) to be applied to a group of servers having similar security filter setting requirements.

Referring to FIG. 1, in a typical implementation, the external host devices 104, 106a-106n (also referred to as external devices or host devices) attempt to connect to protected network server devices 160a-160n within a protected network 100 typically via a private network or a public computer network such as the Internet 102. Examples of external host devices include servers, laptops, desktop computers, tablet devices, mobile phones, mobile computing devices, video games systems, televisions and other similar devices and systems typically having Internet connectivity.

In a preferred embodiment, the protected network 100 is protected by a protection system 150 (e.g., a network monitoring device) preferably located between the Internet 102 and the protected network 100. Usually, the protected network 100 is an enterprise network, such as a school network, business network, and government network, to list a few examples. In other embodiments, the protection system 150 is located within the Internet, service provider network or enterprise network rather than as a network edge as illustrated. It is to be appreciated that when deployed within the protected network 100, traffic is diverted to the protection system 150.

The protection system 150 preferably includes a packet processing system preferably having an external high speed network interface 152 and a protected high-speed network interface 154. Typically, these interfaces are capable of handling 1-100 Gbps, for example. System 150 may further include processing modules, such as traffic analyzer 156 that preferably process the packets received at interfaces 152 and 154. Additionally, a central processing unit (CPU), random access memory (RAM), and one or more storage mediums/databases 158 are preferably connected through buses and are used to further support the threat detection processing of the received packets in accordance with the illustrated embodiments. Computer code is preferably stored in storage medium 158 and executed by the CPU of protection system 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory, a memory address is specified and the data stored at that address is returned. With CAM memory, the entire memory is searched to see if specified data are stored anywhere in the memory. The storage medium 158 may preferably store, capture, and collate sample network traffic data packets, as discussed further below.

In a typical implementation, the protection system 150 is configured and operable to classify and cluster network servers 160a-160d within the protected network 100 to efficiently protect the determined clustered servers by automatically determining and applying common security filter settings (e.g., DDos/DoS countermeasures) relevant to network services provided by the determined clustered network servers.

Figure 2:
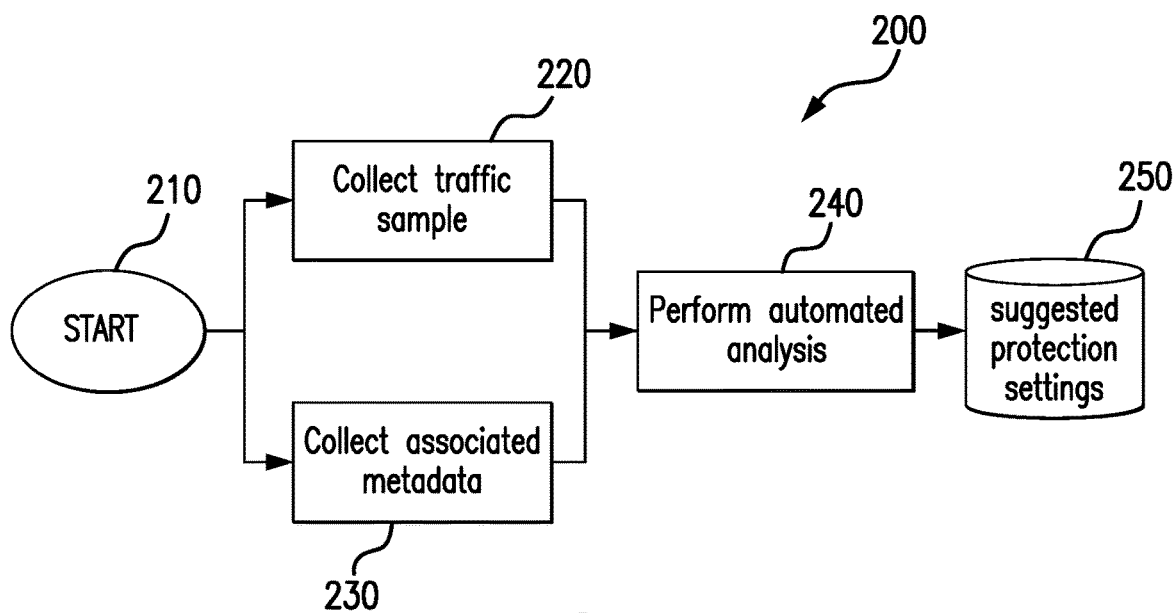
FIG. 2 is a flowchart depicting certain operational steps performed in accordance with an illustrative embodiment.

With reference now to FIG. 2 (and with continuing reference to FIG. 1) shown is flowchart depicting certain operational steps (process 200) performed by the protection device 150 in accordance with certain illustrative embodiments. Before turning to the descriptions of FIG. 2, it is noted that the flow diagram shown therein is described, by way of example, with reference to components shown in FIG. 1. It is to be understood these operational steps may be carried out in various capable systems and are not to be limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in differing orders, or in other combinations or sub-combinations. It should be appreciated that in some embodiments some of the steps described below may be combined into a single step. In some embodiments, one or more additional steps may be included.

Starting at step 210, in a traffic flow 151 received by the protection device 150, included in the traffic flow are data packets transmitting to and from external devices 104, 106a-106n with one or more protected devices 160a-160n. It is to be appreciated the traffic flow 151 may be data packets transmitted from the protected devices 160a-160d, data packets transmitted to the external devices 104, 106a-106d as well as data packets flowing both to and from the external devices 104, 106a-106d and the protected devices 160a-160d. In accordance with the illustrated embodiment of FIG. 2, preferably a sample of data packets associated with the network servers 160a-160d are intercepted and captured in the from the data packet traffic flow 151. These captured data packets are then collated and grouped according to the protected network server 160a-160d they are associated with. These captured data packets are preferably stored in one or more databases associated with storage device 158. The collated captured data packets are then analyzed to determine a profile of one or more network services provided by each of the protected network servers 160a-160d associated with the stored collated data packets, preferably chosen from a predefined listing of network services (step 220). For instance, examples of such network services may include (but are not to be understood to be limited to): Hypertext Transfer Protocol (HTTP); Hypertext Transfer Protocol Secure (HTTPS); Simple Mail Transfer Protocol (SMTP); and Voice over Internet Protocol (VoIP)). These network services determinations may be made from analysis of the samples of traffic data collected such as determining the utilized server ports of the network servers 160a-160d associated with the sample data traffic collected. For example, if the collected data samples indicate a server 160a utilized ports 80 and 25, then this would indicate that server 160a is performing HTTP (port 80) and SMTP (port 25) network services functionality. In certain embodiments, each of the protected network servers 160a-160d associated with the stored collated data packets are preferably tagged with one or more network services determined provided by each network server 160a-160d based upon analysis of the collated network traffic by the protection device 150. An example of such an analysis of the captured collated data packets may include for instance, determining an identity of a utilized port of a network server 160a-160d associated with the collated network traffic for each of the plurality of network servers 160a-160d.

It is to be understood the protection device 150 is operable, based upon collected metadata from the collated network traffic, to broadly categorize the network services (e.g., mail servers, web servers, DNS servers, etc.) provided by the protected network servers 160a-160d. With regards to the stored collated network traffic, the protection device 150 is further preferably configured and operable to determine additional metadata that was not present in the captured network traffic sample (step 230). For instance, the determined metadata associated with each of the plurality of network servers 160a-160d associated with the collated network traffic may include one or more of determining (which is not to be understood to be limited to): a domain name; network traffic speed; network packet route information; and network packet latency associated with each of the plurality of network servers 160a-160d.

It is to be appreciated that additional information regarding the protected network servers 160a-160d may be determined from analysis of the collected metadata. For instance, if the metadata includes DNS information indicating a server 160a has a domain name including "mail.server", then this would indicate that the server 160a is performing mail services, such as SMTP. As another example, if the metadata indicates a server 160b has a relatively high latency, then analysis by protection device 150 would indicate this server 160b is located in a location remote from other network servers having a substantially lower latency. The protection device (step 240) is further operational and configured to perform an automated analysis on the collected traffic samples 220 and associated collected metadata 230 (step 240) to determine, and store, suggested security filter settings for each of the plurality of network servers 160a-160d (step 250). It is to be appreciated that in accordance with the illustrated embodiment, the suggested security filter setting determined for servers 160a-160d is not actually applied to that server as a security filter setting but rather is preferably associated with it for determining a common filter setting for a server cluster that particular server is to be grouped within as described below.

Figure 3:
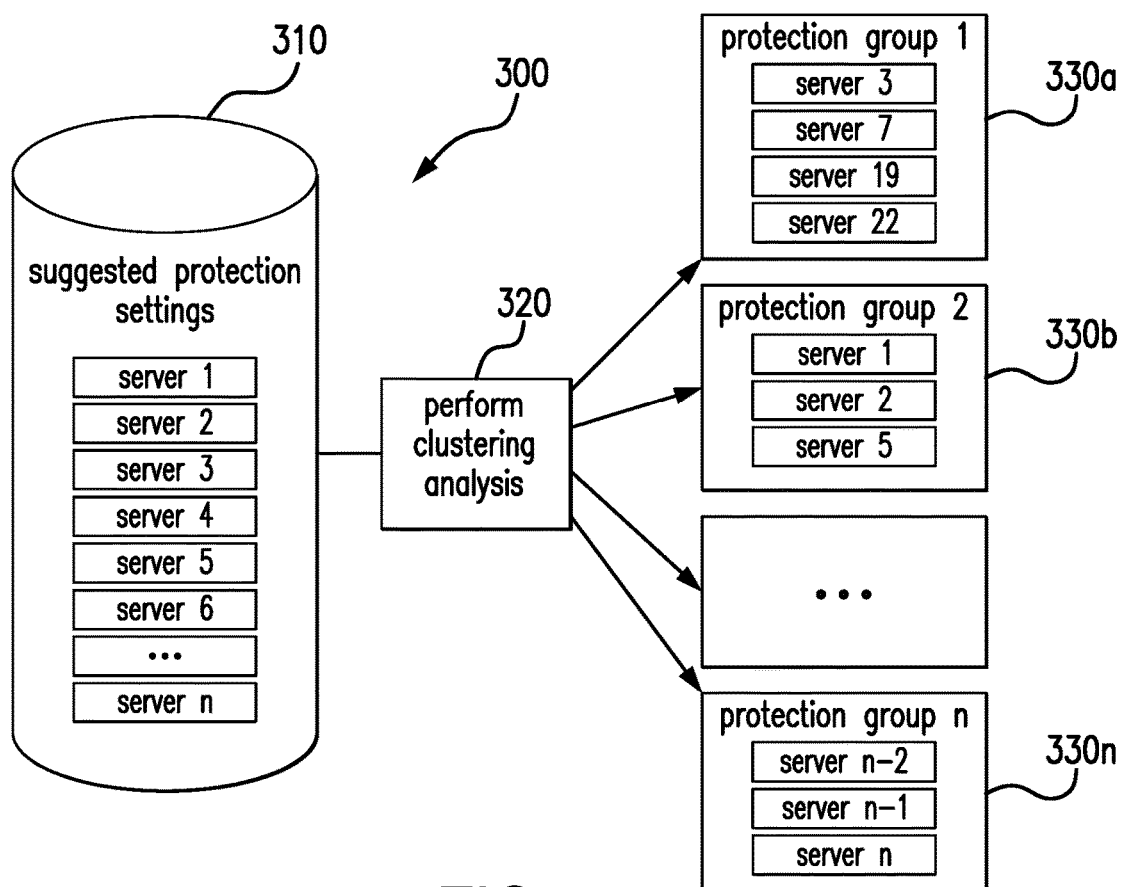
FIG. 3 is a system level diagram depicting certain operational steps performed for clustering servers in view of their suggested security filter settings in accordance with an illustrative embodiment.

Next, and with reference now to FIG. 3 (and with continuing reference to FIG. 1), the process 300 for determining one or more clusters of network servers is now described. Starting at step 310, the protection device 150 analyzes the stored suggested security filter settings preferably determined for each of the plurality of servers 160a-160d (step 310). Preferably using machine learning techniques, such as K-means algorithmic techniques, the protection device 150 performs a clustering analysis to group one or more servers from the plurality of servers 160a-160d together based upon similarity of their suggested security filter settings (step 320). These determined clusters thereafter form suggested protection groups of servers (330a-330n) in view of the determined similarity of their associated suggested security filter settings. For instance, the clustering analysis of step 320 may include first determining a variance of the suggested network security filter settings for each of the plurality of network servers 160a-160d relative to one another. The one or more of the plurality of network servers (e.g., servers 3, 7, 19 and 22) are clustered with one another (e.g., protection group 1 (330a)) if the determined variance of suggested network security filter settings for each network server (e.g., servers 3, 7, 19 and 22) is within a prescribed variance range.

Figures 4, 5:
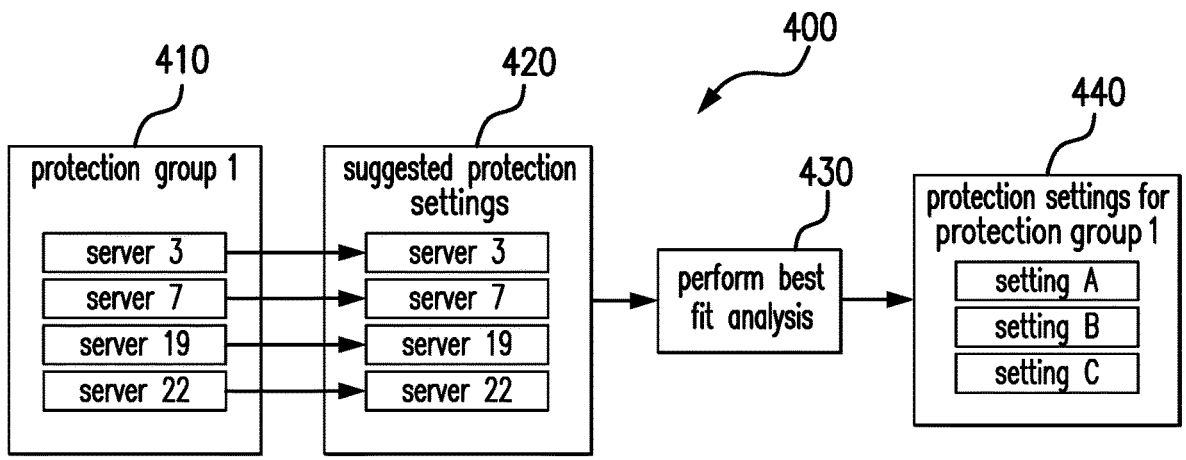
FIG. 4 is a system level diagram depicting certain operational steps performed for determining group security filter settings in accordance with an illustrative embodiment.
FIG. 5 illustrates a chart depicting the process for generating a fitness rating for a server in view of a group security filter setting in accordance with an illustrative embodiment.

With reference now to FIG. 4 (and with continuing reference to FIG. 1), the process 400 for determining common network security group filter settings is now described. Starting at step 410, the protection device 150 preferably performs an analysis of each determined protection group (e.g, protection group 1—clustered servers 3, 7, 19 and 22) by preferably analyzing the suggested security filter setting associated with each server in that grouping (e.g, protection group 1—clustered servers 3, 7, 19 and 22) (step 430) to determine a common network security group filter setting for each determined protection group (e.g, protection group 1—clustered servers 3, 7, 19 and 22) (step 440). Thus, it is to be appreciated that the common network security group filter setting for a protection group (e.g., protection group 1 (330a)) is most likely different with respect to each respective common network security group filter setting prescribed for the other determined server protection groups (e.g., protection group 2 (330b)—servers 1, 2 and 5). It is to be further appreciated that the process for determining common network security group filter settings (step 430) may include using linear regression techniques for conducting a best-fit analysis relative to the suggested network security filter settings for each network server (e.g., servers 3, 7, 19, 22) in a determined cluster of network servers (e.g., protection group 1). Generally, the aforementioned best-fit analysis normalizes each of the suggested security filer settings associated with the servers (e.g., servers 3, 7, 19, 22) in a determined cluster of network servers (e.g., protection group 1). Thereafter, the aforesaid determined common network security protection filter setting for a given protection group (e.g., protection group 1) is then prescribed upon each server (e.g., servers 3, 7, 19, 22) in that protection group. It is to be appreciated the Fitness Rating is particularly advantageous in that in enables a network administration to view how well a particular server fits in a particular protection group.

Additionally, it is to be appreciated that the aforesaid processes 200, 300, 400 and 500 may be periodically repeated since network changes evolve over time as new services are added and servers are repurposed, removed and/or added. Thus, this process of grouping servers as described herein is typically to be performed on an ongoing basis.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary illustrated embodiments, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method performed by a computer system having one or more processors and memory for storing one or more programs for execution by the one or more processors for determining common network security filter settings for one or more clusters of network servers, comprising the steps:

capturing network traffic samples associated with a plurality of network servers;

collating the captured network traffic samples with regards to each of the plurality of network servers;

analyzing the collated network traffic samples for each of the plurality of network servers to determine network services provided by each of the plurality of network servers wherein the network services consist of: HyperText Transfer Protocol (HTTP); Hypertext Transfer Protocol Secure (HTTPS); Simple Mail Transfer Protocol (SMTP); and Voice over Internet Protocol (VoIP);

determining suggested network security filter settings for each of the plurality of network servers;

determining one or more clusters of network servers from the plurality of network servers in response to the determined suggested network security filter settings for each of the plurality of networks servers; and determining common network security group filter settings for each of the one of more determined clusters of network servers wherein a common network security group filter setting for one of the one or more determined clusters of network servers is different with respect to other common network security group filter settings prescribed for others of the one or more determined clusters of network servers.

2. The method as recited in claim 1, further including the step of prescribing a determined common network security filter setting upon each network server grouped in a determined cluster of network servers associated with that common network the determined common network security setting.

3. The method as recited in claim 2, wherein the determining common network security group filter settings includes using linear regression techniques for conducting a best-fit analysis relative to the suggested network security filter settings for each of the plurality of network servers in a determined cluster of network servers.

4. The method as recited in claim 3, further including determining a fitness rating for each server in the one or more clusters of network servers wherein the fitness rating consists of a comparison of the suggested network security filter settings for a given network server with the common network security group filter settings the given network server is prescribed with.

5. The method as recited in claim 1, wherein the analyzing the collated network traffic samples further includes
determining metadata associated with each of the plurality of network servers from analysis of the captured network traffic samples.

6. The method as recited in claim 5, wherein the analyzing the collated network traffic samples for each of the plurality of network servers includes analyzing the network services and metadata associated with each of the plurality of network servers to determine the suggested network security filter settings for each of the plurality of network servers.

7. The method as recited in claim 5, wherein the determining the metadata associated with each of the plurality of network servers includes one or more of determining: a domain name; network traffic speed; network packet route information; and
network packet latency associated with each of the plurality of network servers.

8. The method as recited in claim 1, wherein the determined common network security settings prescribe DoS mitigation actions including one or more of: limiting bandwidth associated with suspected attack traffic; altering traffic routes for suspected attack traffic; and filtering out suspected attack traffic destined for the determined cluster of network servers.

9. The method as recited in claim 1, wherein the capturing network traffic samples includes capturing network traffic flowing into and out of the plurality of network servers.

10. The method as recited in claim 1, wherein the determining one or more clusters of network servers includes using machine learning techniques.

11. The method as recited in claim 10, wherein the machine learning techniques includes using a k-means algorithm.

12. The method as recited in claim 11, wherein the determining one or more clusters of network servers includes:
determining a variance of the suggested network security filter settings for each of the plurality of network servers relative to one another; and
clustering one or more of the plurality of network servers with one another if the determined variance of suggested network security filter settings is within a prescribed variance range.

13. A computer system for monitoring network traffic associated with a plurality of protected network servers to determine one or more groups of protected network servers and determine common network filter settings for each of the one or more groups of protected network servers, comprising:
one or more data bases having memory configured to store instructions;
a processor disposed in communication with said memory, wherein said processor upon execution of the instructions is configured to:
intercept data communications in a computer network to capture samples of network traffic transmitting between one or more external hosts with the plurality of protected network servers;
collate the captured network traffic samples with regards to each of the plurality of protected network servers;
analyze the collated network traffic samples for each of the plurality of protected network servers to determine network services provided by each of the plurality of protected network servers wherein the network services consist of: HyperText Transfer Protocol (HTTP); Hypertext Transfer Protocol Secure (HTTPS); Simple Mail Transfer Protocol (SMTP); and Voice over Internet Protocol (VoIP);
determine suggested network security filter settings for each of the plurality of protected network servers;
determine one or more clusters of network servers from the plurality of protected network servers responsive to the determined suggested network security filter settings for each of the plurality of protected networks servers; and
determine common network security group filter settings for each of the one or more determined clusters of network servers wherein a common network security group filter setting for one of the one or more determined clusters of network servers is different with respect to other common network security group filter settings prescribed for others of the one or more determined clusters of network servers.

14. The computer system for monitoring network traffic as recited in claim 13, wherein the processor is further configured to prescribe a determined common network security filter setting upon each network server grouped in a determined cluster of network servers associated with the determined common network security filter setting.

15. The computer system for monitoring network traffic as recited in claim 13, wherein the analyzing the collated network traffic samples further includes
determining metadata associated with each of the plurality of network servers from the analysis of the captured network traffic samples.

16. The computer system for monitoring network traffic as recited in claim 15, wherein the analyzing the collated network traffic samples for each of the plurality of protected network servers includes analyzing the network services and metadata associated with each of the plurality of protected network servers to determine the suggested network security filter settings for each of the plurality of protected network servers.

17. The computer system for monitoring network traffic as recited in claim 15, wherein the determining one or more clusters of network servers includes:
determining a variance of the suggested network security filter settings for each of the plurality of protected network servers relative to one another; and
clustering one or more of the plurality of protected network servers with one another if the determined variance of suggested network security filter settings is within a prescribed variance range.

\* \* \* \* \*